(12) United States Patent
Haleem et al.

(10) Patent No.: US 10,214,648 B2
(45) Date of Patent: Feb. 26, 2019

(54) BISAZO DYES AND MIXTURES THEREOF

(71) Applicant: ARCHROMA IP GMBH, Reinach (CH)

(72) Inventors: Asad Bilal Haleem, Karachi (PK); Shahid Ali Ahmed, Karachi (PK)

(73) Assignee: ARCHROMA IP GMBH, Reinach (CH)

( * ) Notice: Subject to any disclaimer, the term of this patent is extended or adjusted under 35 U.S.C. 154(b) by 0 days.

(21) Appl. No.: 15/129,517

(22) PCT Filed: Mar. 31, 2015

(86) PCT No.: PCT/EP2015/000700
§ 371 (c)(1),
(2) Date: Sep. 27, 2016

(87) PCT Pub. No.: WO2015/149940
PCT Pub. Date: Oct. 8, 2015

(65) Prior Publication Data
US 2017/0121527 A1    May 4, 2017

(30) Foreign Application Priority Data

| Apr. 1, 2014 | (EP) | 14001210 |
| Apr. 1, 2014 | (PK) | 298/2014 |
| Aug. 12, 2014 | (EP) | 14002813 |

(51) Int. Cl.
| *C09B 62/513* | (2006.01) |
| *C09B 62/51* | (2006.01) |
| *C09B 62/00* | (2006.01) |
| *C09B 62/44* | (2006.01) |
| *C09B 67/22* | (2006.01) |

(52) U.S. Cl.
CPC ............ *C09B 62/513* (2013.01); *C09B 62/44* (2013.01); *C09B 62/51* (2013.01); *C09B 67/0054* (2013.01); *C09B 67/0059* (2013.01)

(58) Field of Classification Search
CPC ... C09B 62/513; C09B 67/0059; C09B 62/51; C09B 62/44; C09B 67/0054
See application file for complete search history.

(56) References Cited

U.S. PATENT DOCUMENTS

| 4,430,259 A | 2/1984 | Mischke et al. |
| 5,731,421 A * | 3/1998 | Tzikas ............... C09B 62/4411 534/632 |
| 2002/0162178 A1 | 11/2002 | Huang et al. |
| 2005/0150063 A1 | 7/2005 | Eichhorn |
| 2008/0039614 A1 | 2/2008 | Chen et al. |
| 2008/0295732 A1 | 12/2008 | Eichhorn et al. |

FOREIGN PATENT DOCUMENTS

| CN | 101283054 A1 | 10/2008 |
| EP | 0 741 169 A1 | 11/1996 |
| JP | 1982111359 U | 1/1984 |
| JP | H11349845 A | 12/1999 |
| JP | 2001106935 A | 4/2001 |
| JP | 2009512743 A | 3/2009 |
| WO | 95017471 A1 | 6/1995 |
| WO | 2007/006653 A2 | 1/2007 |
| WO | 2007/039573 A2 | 4/2007 |
| WO | WO 2007/039573 * | 4/2007 |
| WO | 2013/017331 A1 | 2/2013 |

OTHER PUBLICATIONS

Internsation Search Report of PCT/EP2015/000700 filed Jun. 26, 2015.

* cited by examiner

*Primary Examiner* — Amina S Khan
(74) *Attorney, Agent, or Firm* — McBee Moore Woodward & Vanik IP, LLC

(57) ABSTRACT

The present invention relates to novel bisazo dyes, a process for their preparation and their use for dyeing and/or printing substrates.

19 Claims, No Drawings

BISAZO DYES AND MIXTURES THEREOF

CROSS REFERENCE TO RELATED APPLICATIONS

This application is a § 371 National State Application of PCT/EP2015/000700, filed Mar. 31, 2015, which claims priority to European Application No. 14001210.5 filed Apr. 1, 2014, PK Application No. 298/2014 filed Apr. 1, 2014 and EP Application No. 14002813.5 filed Aug. 12, 2014.

FIELD OF THE INVENTION

The present invention relates to novel bisazo dyes, a process for their preparation and their use for dyeing and/or printing substrates.

BACKGROUND OF THE INVENTION

Azo dyes, including fiber-reactive azo dyes are known in the art. For example, WO 2007/039573 A2 relates to azo reactive dyes and mixtures of fiber-reactive azo dyes, to processes for their preparation and to their use for dyeing and printing hydroxyl- and carboxamido-containing materials.

However, there is still a need for novel dyes, in particular fiber-reactive dyes, with improved properties such as dye levelness (i.e. the uniformity of color shade along the substrate to be dyed), color fastness (light and wet/washing fastness, i.e. the resistance of the color to fading and running when exposed to light and/or wetness) and build-up behavior.

OBJECT OF THE INVENTION

It is an object of the present invention to provide novel dyes including fiber-reactive dyes with improved dyeing characteristics, such as levelness, light and wet/washing fastnesses and build-up behavior which are highly suitable for dyeing and/or printing substrates, such as paper, textiles, glass, plastics or metal, and can be applied in combination with other dyes.

The improvement of the dyes of the present invention is particularly achieved during dyeing and printing processes, such as inkjet printing.

SUMMARY OF THE INVENTION

The object can be achieved with the compound of formula (I) according to the invention.

It has been surprisingly found that two aminoaryl compounds in diazotized form can be coupled onto 3-aminophenylurea. Depending on the substitution of the aryl group denoted hereinunder as $K^1$ and $K^2$ the compound of the general formula (I) may be a non-reactive or reactive towards fibers. The latter compounds are also denoted herein under as fiber-reactive dyes.

The improvement of the dyes of the present invention is particularly achieved during dyeing and printing processes, such as inkjet printing.

In a first aspect, the invention relates to a compound of the general formula (I)

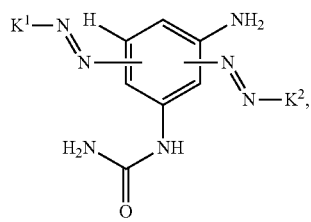

wherein $K^1$ and $K^2$ are independently unsubstituted or substituted aryl.

In one embodiment, the substituents of the substituted aryl are selected from the group of H, —$SO_3H$, unsubstituted or substituted, linear or branched $C_{1-6}$ alkyl, unsubstituted or substituted, linear or branched $C_{1-6}$ alkoxy or $SO_2Y$, wherein Y is —OH, —CH=$CH_2$ or —$CH_2CH_2$—Z, wherein Z is a leaving group which can be eliminated by $OH^-$ ions.

In one embodiment, the substituents of the substituted alkyl and alkoxy groups are selected from the group consisting of halogen, —CN, —$NH_2$ or —COOH.

In one embodiment, $K^1$ is

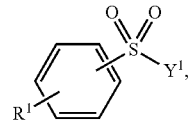

$K^2$ is

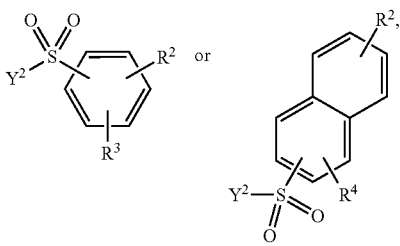

$R^1$ and $R^2$ are independently H, —$SO_3H$, unsubstituted or substituted, linear or branched $C_{1-6}$ alkyl or unsubstituted or substituted, linear or branched $C_{1-6}$ alkoxy, $R^3$ is H, unsubstituted or substituted, linear or branched $C_{1-6}$ alkyl or unsubstituted or substituted, linear or branched $C_{1-6}$ alkoxy, $R^4$ is H or —$SO_3H$, $Y^1$ and $Y^2$ are independently —OH, —CH=$CH_2$ or —$CH_2CH_2$—Z, wherein Z is a leaving group which can be eliminated by $OH^-$ ions.

In one embodiment, $K^1$ is

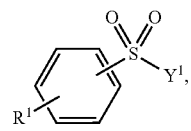

$K^2$ is

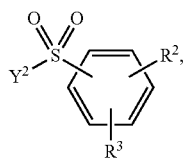

$R^1$ and $R^2$ are independently H, —$SO_3H$, unsubstituted or substituted $C_{1-2}$ alkyl or unsubstituted or substituted $C_{1-2}$ alkoxy, $R^3$ is H, methyl or methoxy, $Y^1$ and $Y^2$ are independently —OH, —CH=$CH_2$ or —$CH_2CH_2$—Z, wherein Z is —Cl or —$OSO_3H$.

In one embodiment, $K^1$ is

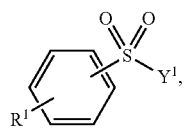

$K^2$ is

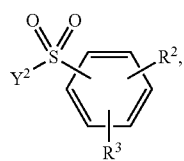

$R^1$ and $R^2$ are independently H, —$SO_3H$, unsubstituted or substituted $C_{1-2}$ alkyl or unsubstituted or substituted $C_{1-2}$ alkoxy, $R^3$ is H, $Y^1$ and $Y^2$ are independently —OH, —CH=$CH_2$ or —$CH_2CH_2$—Z, wherein Z is —Cl or —$OSO_3H$.

In one embodiment, $K^1$ is

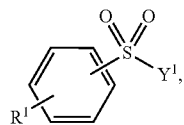

$K^2$ is

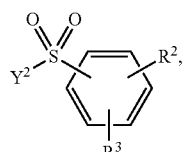

$R^1$ and $R^2$ are independently H, —$SO_3H$, unsubstituted or substituted $C_{1-2}$ alkyl or unsubstituted or substituted $C_{1-2}$ alkoxy, $R^3$ is H, $Y^1$ and $Y^2$ are independently —OH, —CH=$CH_2$ or —$CH_2CH_2$—Z, wherein Z is —Cl or —$OSO_3H$, wherein the $SO_2Y^1$ group is in para-position or in meta-position to the azo group.

In one embodiment,

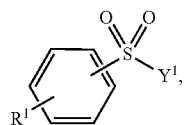

$K^1$ is

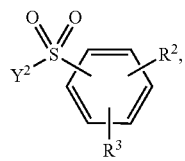

$K^2$ is $R^1$ is —$SO_3H$, $R^2$ and $R^3$ are H, $Y^1$ and $Y^2$ are —$CH_2CH_2$—Z, wherein Z is —$OSO_3H$, wherein the $SO_2Y^1$ group and the $SO_2Y^2$ group are in para-position to the azo groups and wherein $R^1$ is in ortho-position to the azo group.

In one embodiment, $K^1$ is

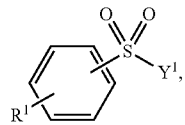

$K^2$ is

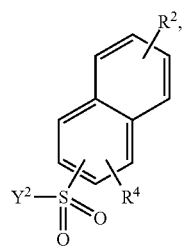

$R^1$ and $R^2$ are independently H, —$SO_3H$, unsubstituted or substituted, linear or branched $C_{1-6}$ alkyl or unsubstituted or substituted, linear or branched $C_{1-6}$ alkoxy, $R^4$ is H or —$SO_3H$, $Y^1$ and $Y^2$ are independently —OH, —CH=$CH_2$ or —$CH_2CH_2$—Z, wherein Z is a leaving group which can be eliminated by $OH^-$ ions.

In one embodiment,
$K^1$ is

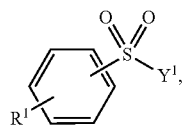

$K^2$ is

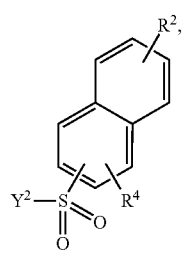

$R^1$ and $R^2$ are independently H, —SO₃H, unsubstituted or substituted $C_{1-2}$ alkyl or unsubstituted or substituted $C_{1-2}$ alkoxy, $R^4$ is H or —SO₃H, $Y^1$ and $Y^2$ are independently —OH, —CH=CH₂ or —CH₂CH₂—Z, wherein Z is —Cl or —OSO₃H.

In one embodiment,
$K^1$ is

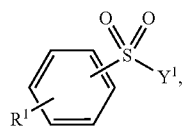

$K^2$ is

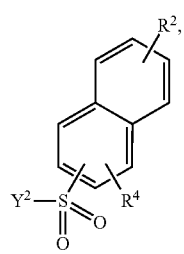

$R^1$ and $R^2$ are independently H, —SO₃H, unsubstituted or substituted $C_{1-2}$ alkyl or unsubstituted or substituted $C_{1-2}$ alkoxy, $R^4$ is H, $Y^1$ is —CH=CH₂ or —CH₂CH₂—Z, wherein Z is —Cl or —OSO₃H, $Y^2$ is —OH, —CH=CH₂ or —CH₂CH₂—Z, wherein Z is —Cl or —OSO₃H.

In one embodiment,
$K^1$ is

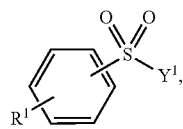

$K^2$ is

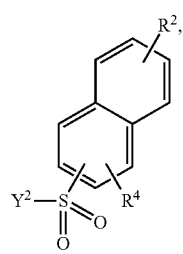

$R^1$ and $R^2$ are independently H, —SO₃H, unsubstituted or substituted $C_{1-2}$ alkyl or unsubstituted or substituted $C_{1-2}$ alkoxy, $R^4$ is H, $Y^1$ is —CH=CH₂ or —CH₂CH₂—Z, wherein Z is —Cl or —OSO₃H, $Y^2$ is —OH, —CH=CH₂ or —CH₂CH₂—Z, wherein Z is —Cl or —OSO₃H.

wherein the SO₂Y¹ group is in para-position or in meta-position to the azo group.

In a second aspect, the invention relates to a process for the manufacture of a compound of formula (I) according to the invention, comprising at least steps (i) and (ii):

(i) reacting 3-aminophenylurea (V)

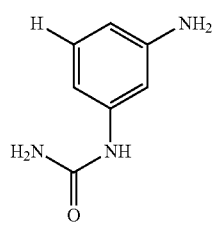

with either a compound of formula (II) in diazotized form

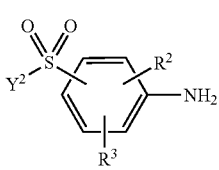

or a compound of formula (III) in diazotized form

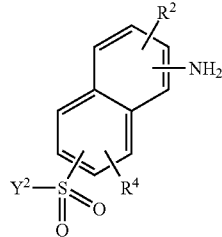

(III)

(ii) reacting the product obtained in step (i) with a compound of formula (IV) in diazotized form

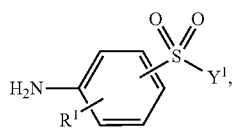

(IV)

or at least comprising the steps (i) and (ii):
(i) reacting a 3-aminophenylurea (V) with a compound of formula (IV) in diazotized form
(ii) reacting the product obtained in step (i) with either a compound of formula (II) in diazotized form or a compound of formula (III) in diazotized form,
wherein all substituents are as defined above.

In a third aspect, the invention relates to a composition comprising at least one compound of formula (I) according to the invention or a salt thereof and a medium, wherein the composition comprises (a) from 0.01 to 30 parts, or from 0.1 to 20 parts, or from 0.5 to 15 parts, or from 1 to 5 parts of at least one compound of formula (I) or a salt thereof; and
(b) from 70 to 99.99 parts, or from 80 to 99.9 parts, or from 85 to 99.5 parts, or from 95 to 99 parts of a medium comprising a mixture of water and an organic solvent, an organic solvent free from water, or a low melting point solid, wherein all parts are by weight and the number of parts of (a)+(b) amounts to 100.

The invention also relates to an ink or printing ink or inkjet printing ink or printing paste or dyeing bath for printing or dyeing a substrate, comprising a compound according to the invention or as prepared according to the invention or a composition according to the invention.

DETAILED DESCRIPTION OF THE INVENTION

In a first aspect, the invention provides a compound of the general formula (I)

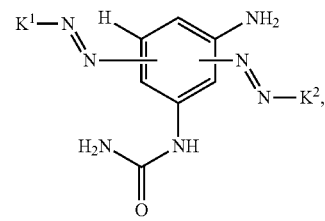

(I)

wherein $K^1$ and $K^2$ are independently unsubstituted or substituted aryl.

In one embodiment, the substituents of the substituted aryl are selected from the group of H, —SO$_3$H, unsubstituted or substituted, linear or branched $C_{1-6}$ alkyl, unsubstituted or substituted, linear or branched $C_{1-6}$ alkoxy or SO$_2$Y, wherein Y is —OH, —CH=CH$_2$ or —CH$_2$CH$_2$—Z, wherein Z is a leaving group which can be eliminated by OH$^-$ ions.

In a further embodiment, the substituents of the substituted alkyl and alkoxy groups are selected from the group consisting of halogen, —CN, —NH$_2$ or —COOH.

In one embodiment
$K^1$ is

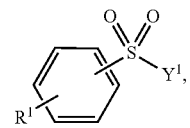

$K^2$ is

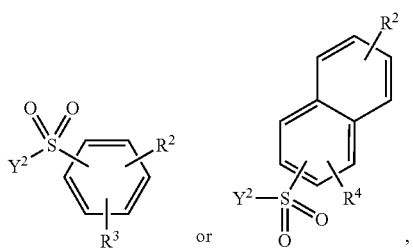

$R^1$ and $R^2$ are independently H, —SO$_3$H, unsubstituted or substituted, linear or branched $C_{1-6}$ alkyl or unsubstituted or substituted, linear or branched $C_{1-6}$ alkoxy, $R^3$ is H, unsubstituted or substituted, linear or branched $C_{1-6}$ alkyl or unsubstituted or substituted, linear or branched $C_{1-6}$ alkoxy, $R^4$ is H or —SO$_3$H, $Y^1$ and $Y^2$ are independently —OH, —CH=CH$_2$ or —CH$_2$CH$_2$—Z, wherein Z is a leaving group which can be eliminated by OH$^-$ ions.

In one embodiment, Z is selected from the group consisting of halides, phosphate esters, sulfate esters and tertiary amines.

In a further embodiment, either $Y^1$ or $Y^2$ is —OH.

In a further embodiment
K¹ is

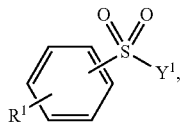

K² is

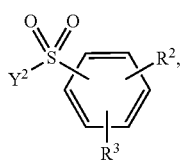

R¹ and R² are independently H, —SO₃H, unsubstituted or substituted $C_{1-2}$ alkyl or unsubstituted or substituted $C_{1-2}$ alkoxy, R³ is H, methyl or methoxy, Y¹ and Y² are independently —OH, —CH=CH₂ or —CH₂CH₂—Z, wherein Z is —Cl or —OSO₃H.

In a further embodiment
K¹ is

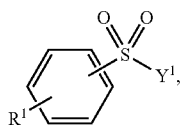

K² is

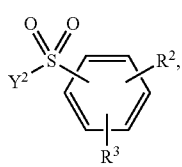

R¹ and R² are independently H, —SO₃H, unsubstituted or substituted $C_{1-2}$ alkyl or unsubstituted or substituted $C_{1-2}$ alkoxy, R³ is H, Y¹ and Y² are independently —OH, —CH=CH₂ or —CH₂CH₂—Z, wherein Z is —Cl or —OSO₃H.

In a further embodiment
K¹ is

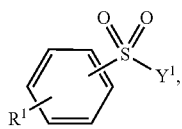

K² is

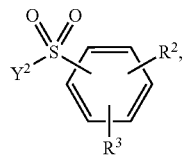

R¹ and R² are independently H, —SO₃H, unsubstituted or substituted $C_{1-2}$ alkyl or unsubstituted or substituted $C_{1-2}$ alkoxy, R³ is H, Y¹ and Y² are independently —OH, —CH=CH₂ or —CH₂CH₂—Z, wherein Z is —Cl or —OSO₃H, wherein the SO₂Y¹ group is in para-position or in meta-position to the azo group.

In a further embodiment
K¹ is

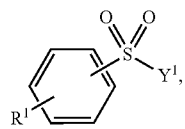

K² is

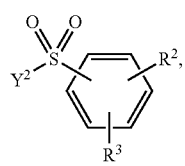

R¹ is —SO₃H,

R² and R3 are H,

Y¹ and Y² are —CH₂CH₂—Z, wherein Z is —OSO₃H, wherein the SO₂Y¹ group and the SO₂Y² group are in para-position to the azo groups and wherein R¹ is in ortho-position to the azo group.

In a further embodiment
K¹ is

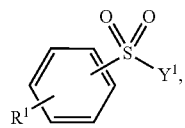

K² is

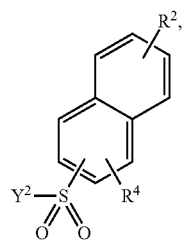

$R^1$ and $R^2$ are independently H, —$SO_3H$, unsubstituted or substituted, linear or branched $C_{1-6}$ alkyl or unsubstituted or substituted, linear or branched $C_{1-6}$ alkoxy,
$R^4$ is H or —$SO_3H$,
$Y^1$ and $Y^2$ are independently —OH, —CH=$CH_2$ or —$CH_2CH_2$—Z, wherein Z is a leaving group which can be eliminated by $OH^-$ ions.

In a further embodiment
$K^1$ is

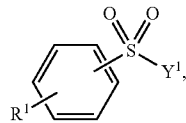

$K^2$ is

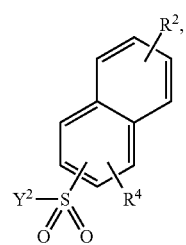

$R^1$ and $R^2$ are independently H, —$SO_3H$, unsubstituted or substituted $C_{1-2}$ alkyl or unsubstituted or substituted $C_{1-2}$ alkoxy,
$R^4$ is H or —$SO_3H$,
$Y^1$ and $Y^2$ are independently —OH, —CH=$CH_2$ or —$CH_2CH_2$—Z, wherein Z is —Cl or —$OSO_3H$.

In a further embodiment
$K^1$ is

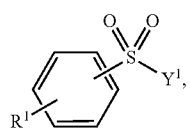

$K^2$ is

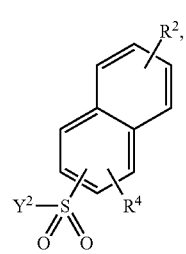

$R^1$ and $R^2$ are independently H, —$SO_3H$, unsubstituted or substituted $C_{1-2}$ alkyl or unsubstituted or substituted $C_{1-2}$ alkoxy,
$R^4$ is H,
$Y^1$ is —CH=$CH_2$ or —$CH_2CH_2$—Z, wherein Z is —Cl or —$OSO_3H$,
$Y^2$ is —OH, —CH=$CH_2$ or —$CH_2CH_2$—Z, wherein Z is —Cl or —$OSO_3H$.

In a further embodiment
$K^1$ is

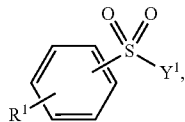

$K^2$ is

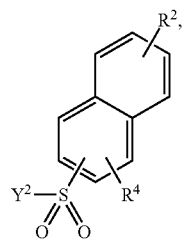

$R^1$ and $R^2$ are independently H, —$SO_3H$, unsubstituted or substituted $C_{1-2}$ alkyl or unsubstituted or substituted $C_{1-2}$ alkoxy,
$R^4$ is H,
$Y^1$ is —CH=$CH_2$ or —$CH_2CH_2$—Z, wherein Z is —Cl or —$OSO_3H$,
$Y^2$ is —OH, —CH=$CH_2$ or —$CH_2CH_2$—Z, wherein Z is —Cl or —$OSO_3H$,
wherein the $SO_2Y^1$ group is in para-position or in meta-position to the azo group.

As used herein, the term "compound" encompasses any single compound or any mixture of two or more compounds of formula (I) as defined herein. Thus, the term "compound" also encompasses mixtures of two or more compounds of formula (I) which are different with respect to their chemical structure and/or with regard to their stereochemical structure.

The term "isomers" as used herein relates to the various meta, ortho and/or para-substituted compounds of formula (I) according to the invention. Accordingly, a mixture of isomers comprises or consists of two or more compounds of formula (I) that are identical with regard to their chemical structure but are different with regard to their stereochemical structure.

The isomers may be separated from each other by conventional separation methods such as crystallization.

In one embodiment, the compound of formula (I) according to the invention may be obtained in the form of a single compound.

In a further embodiment, the compound of formula (I) according to the invention may be obtained in the form of a mixture comprising or consisting of two or more isomers. Among the isomers that may be obtained as a single compound or a mixture of two or more thereof, the following positions of the various substituents and their relative position to each other are to be particularly mentioned:

The $SO_2Y^1$ group may be in ortho-, meta-, or para-position to the azo group.

When the $SO_2Y^1$ group is in ortho-position to the azo group, $R^1$ may be in meta- or para-position to the azo group.

When the $SO_2Y^1$ group is in meta-position to the azo group, $R^1$ may be in ortho- or para-position to the azo group.

When the $SO_2Y^1$ group is in para-position to the azo group, $R^1$ may be in ortho- or meta-position to the azo group.

N=N—$K^1$ and N=N—$K^2$ may be at position 2 or 4 or 6 of the 3-aminophenylurea component.

When N=N—$K^1$ is at position 2 or 4 of the 3-aminophenylurea component, N=N—$K^2$ is at position 6 of the 3-aminophenylurea component.

When N=N—$K^1$ is at position 2 or 6 of the 3-aminophenylurea component, N=N—$K^2$ is at position 4 of the 3-aminophenylurea component.

When N=N—$K^1$ is at position 4 or 6 of the 3-aminophenylurea component, N=N—$K^2$ is at position 2 of the 3-aminophenylurea component.

In one embodiment N=N—$K^1$ is at position 4 of the 3-aminophenylurea component and N=N—$K^2$ is at position 2 or 6 thereof.

In another embodiment N=N—$K^1$ is at position 4 of the 3-aminophenylurea component and N=N—$K^2$ is at position 6 thereof.

When $K^2$ is

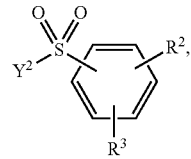

the $SO_2Y^2$ group may be in ortho-, meta- or para-position to the azo group.

In one embodiment $SO_2Y^1$ and $SO_2Y^2$ are both in the para position compared to the azo-group of $K^1$ and $K^2$, respectively, $R_1$ is in ortho position to the azo group, N=N—$K^2$ is in the 4-position of the 3-aminophenylurea component, and N=N—$K^1$ is in the 6-position of the 3-aminophenylurea component.

In particular, the compound of formula (I) may be one of the following compounds, or a mixture thereof:

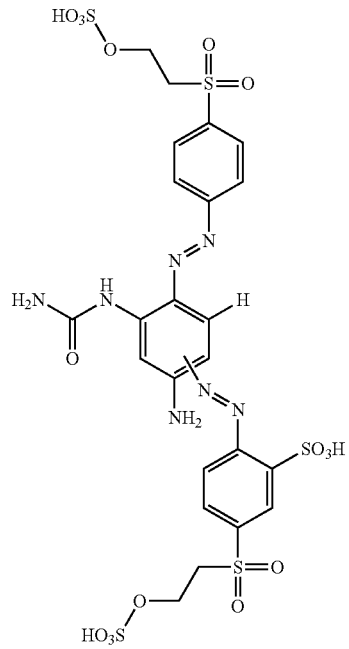

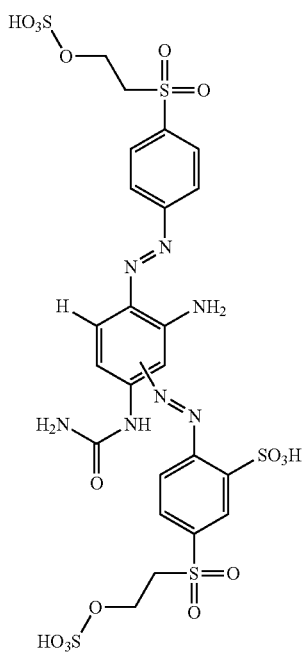

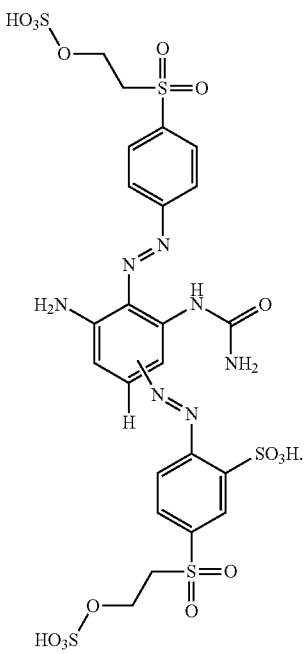

In particular, the compound of formula (I) may be one of the following compounds, or a mixture thereof:

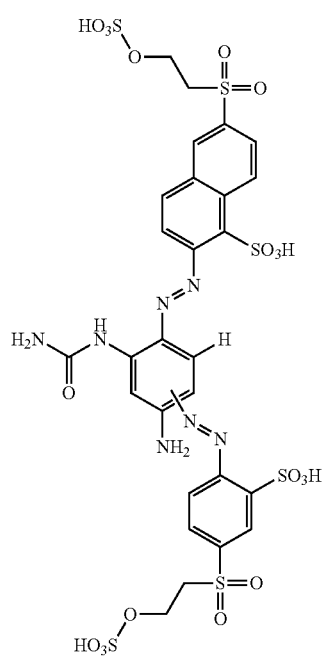
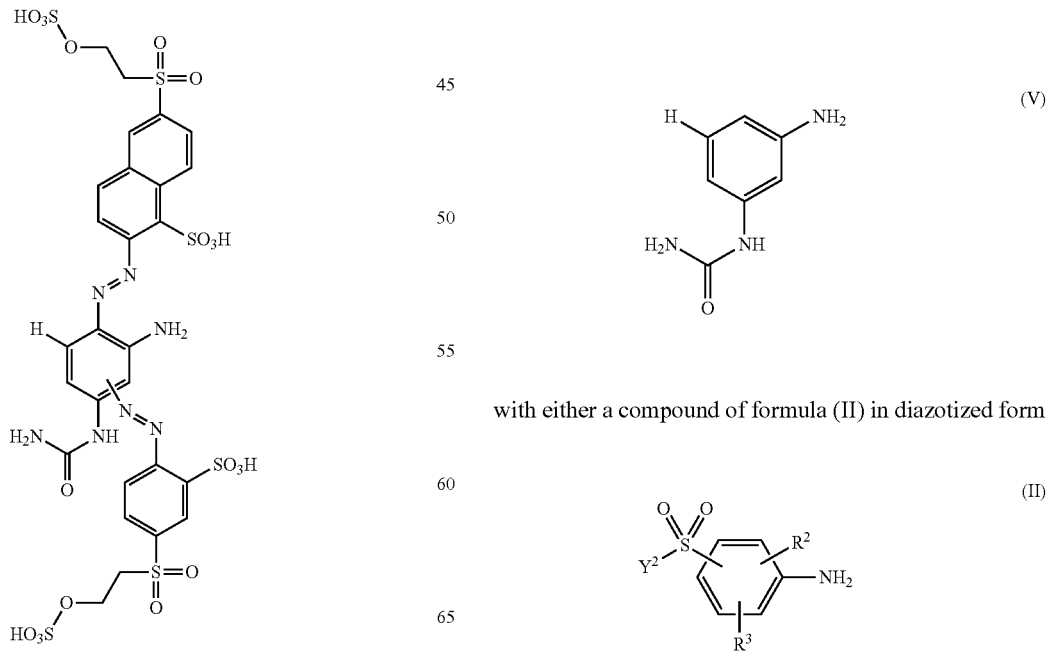
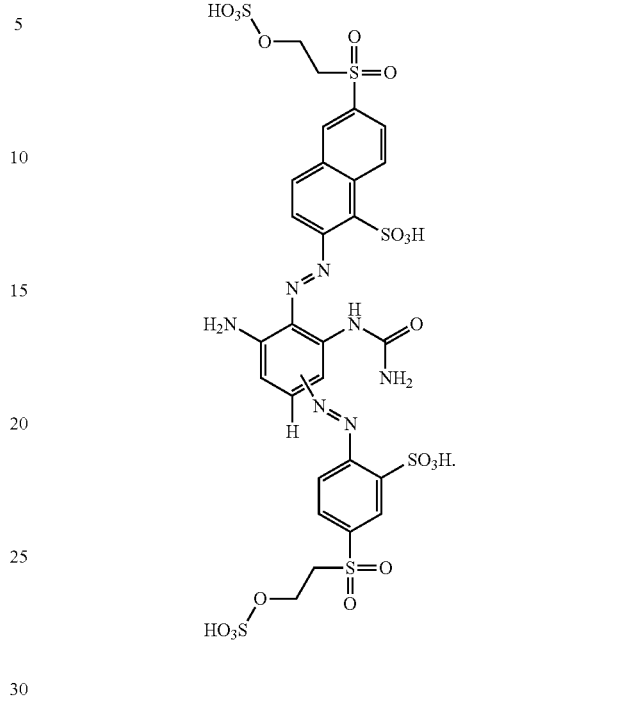
In a second aspect, the invention relates to a process for the manufacture of a compound of formula (I) according to the invention.
The compound according to the invention can be prepared by the following steps:
(i) reacting 3-aminophenylurea (V)
with either a compound of formula (II) in diazotized form or a compound of formula (III) in diazotized form

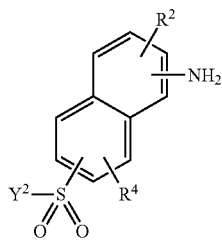

(ii) reacting the product obtained in step (i) with a compound of formula (IV) in diazotized form

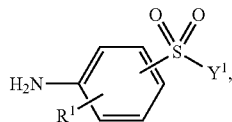

or
(i) reacting 3-aminophenylurea (V) with a compound of formula (IV) in diazotized form
(ii) reacting the product obtained in step (i) with either a compound of formula (II) in diazotized form or a compound of formula (III) in diazotized form,
wherein all substituents are as defined above.

In one embodiment, the process is carried out in an aqueous medium at the temperature of from 0° C. to 40° C., or 0° C. to 25° C., and at a pH of between 3 to 9, or at a pH of 4 to 8.

The compound of formula (I) according to the invention may be isolated in accordance with known methods, for example by salting out, filtering and drying optionally in vacuum and at slightly elevated temperature.

When the compound of formula (I) according to the invention is in its salt-form, the cation associated with the sulfo-groups is not critical and may be any of those nonchromophoric cations conventional in the field of dyestuffs, in particular fiber-reactive dyestuffs provided that the corresponding salt is substantially water-soluble. Examples of those cations are alkali metal cations, for example potassium, lithium or sodium and ammonium cations, e.g. mono-, di-, tri- and tetramethyl or mono-, di-, tri- and tetraethyl cations. The cations may be the same or different, i. e. the compound may be in mixed salt-form.

Depending on the reaction and/or isolation conditions, the compound of formula (I) according to the invention may be obtained as a free acid or in the salt-form or in the mixed salt-form, containing for example at least one of the above-mentioned cations. The compound of formula (I) according to the invention may be converted from the salt-form or mixed salt-form to the free-acid form or vice versa using conventional techniques.

In one embodiment, the compound of formula (I) according to the invention is purified to remove undesirable impurities before it is incorporated into liquid dye preparations for conventional or classical dyeing and printing operations, or inks for inkjet printing. Conventional techniques may be employed for purifying the dyes, for example ultrafiltration, reverse osmosis and/or dialysis. For other uses, especially for conventional or classical printing and dyeing operations, the compound of formula (I) according to the invention may be purified by precipitating, for example by salting out, or purified by for example ultrafiltration, reverse osmosis and/or dialysis.

In a third aspect, the invention relates to a composition comprising at least one compound of formula (I) or a salt thereof and a medium.

In one embodiment, the medium is water, a mixture of water and an organic solvent, an organic solvent free from water, or a low melting point solid.

In one embodiment, the composition comprises:
(a) from 0.01 to 30 parts of at least one compound of formula (I) or a salt thereof as hereinbefore defined; and
(b) from 70 to 99.99 parts of a medium comprising a mixture of water and an organic solvent, an organic solvent free from water, or a low melting point solid;
wherein all parts are by weight and the number of parts of (a)+(b) amounts to 100.

In one embodiment, the number of parts of component (a) is from 0.1 to 20, or from 0.5 to 15, or from 1 to 5 parts. The number of parts of component (b) is from 80 to 99.9, or from 85 to 99.5, or from 95 to 99 parts.

In one embodiment, when the medium comprises a mixture of water and an organic solvent or an organic solvent free from water, component (a) is completely dissolved in component (b).

In one embodiment, component (a) has a solubility in component (b) at 20° C. of at least 10%. This allows the preparation of concentrates which may be used to prepare diluted inks and reduces the chance of the compound of formula (I) from precipitating if evaporation of the liquid medium occurs during storage.

In one embodiment, when the medium comprises a mixture of water and an organic solvent, the weight ratio of water to organic solvent is from 99:1 to 1:99, or from 99:1 to 50:50 or from 95:5 to 80:20.

In one embodiment, the organic solvent present in the mixture of water and organic solvent is a water-miscible organic solvent or a mixture of such solvents.

In one embodiment, water-miscible organic solvents include $C_{1-4}$-alkanols, or methanol, ethanol, n-propanol, isopropanol, n-butanol, sec-butanol, tert-butanol, n-pentanol, cyclopentanol and cyclohexanol; linear amides, or dimethylformamide or dimethylacetamide; ketones and ketonealcohols, or acetone, methyl ether ketone, cydohexanone and diacetone alcohol; water-miscible ethers, or tetrahydrofuran and dioxane; diols, or diols having from 2 to 12 carbon atoms, for example pentane-1,5-diol, ethylene glycol, propylene glycol, butylene glycol, pentylene glycol, hexylene glycol and thiodiglycol and oligo- and poly-alkyleneglycols, or diethylene glycol, triethylene glycol, polyethylene glycol and polypropylene glycol; trials, or glycerol and 1,2,6-hexanetriol; mono-$C_{1-4}$-alkyl ethers of diols, or mono-$C_{1-4}$-alkyl ethers of diols having 2 to 12 carbon atoms, especially 2-methoxyethanol, 2-(2-m ethoxyethoxy)ethanol, 2-(2-ethoxyethoxy)-ethanol, 2-(2-(2-methoxyethoxy)ethoxy]ethanol, 2-[2-(2-ethoxyethoxy)-ethoxy]-ethanol and ethyleneglycol monoallylether, cyclic amides, or 2-pyrrolidone, N-methyl-2-pyrrolidone, N-ethyl-2-pyrrolidone, caprolactam and 1,3-dimethylimidazolidone; cyclic esters, or caprolactone; sulfoxides, or dimethyl sulfoxide and sulfolane. In particular the liquid medium comprises water and 2 or more, especially from 2 to 8, water-soluble organic solvents.

In one embodiment, water-soluble organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$-alkyl and $C_{1-4}$-alkyl ethers of diols, or mono-$C_{1-4}$-alkyl ethers of diols having 2 to 12 carbon atoms, especially 2-methoxy-2-ethoxy-2-ethoxyethanol.

In one embodiment, the medium comprises:
(a) from 75 to 95 parts water; and
(b) from 25 to 5 parts in total of at least one solvent selected from diethylene glycol, 2-pyrrolidone, thiodiglycol, N-methylpyrrolidone, cyclohexanol, caprolactone, caprolactam and pentane-1,5-diol;
wherein the parts are by weight and the sum of the parts (a) and (b)=100.

Examples of further suitable media comprising a mixture of water and at least one organic solvent are described in U.S. Pat. No. 4,963,189, U.S. Pat. No. 4,703,113, U.S. Pat. No. 4,626,284 and EP 4 251 50 A.

In one embodiment, when the liquid medium comprises an organic solvent free from water (i.e. less than 1% water by weight), the solvent has a boiling point from 300° C. to 200° C., or from 40° C. to 150° C., or from 50° C. to 125° C.

In one embodiment, the organic solvent may be water-immiscible, water-miscible or a mixture of such solvents.

In one embodiment, the water-miscible organic solvents are any of the hereinbefore described water-miscible organic solvents and mixtures thereof.

In one embodiment, the water-immiscible solvents include, for example, aliphatic hydrocarbons; esters, or ethyl acetate; chlorinated hydrocarbons, or $CH_2Cl_2$ and ethers, or diethyl ether; and mixtures thereof.

In one embodiment, when the liquid medium comprises a water-immiscible organic solvent, a polar solvent is included to enhance solubility of the dye in the liquid medium. Examples of polar solvents include $C_{1-4}$-alcohols.

In one embodiment, when the liquid medium is an organic solvent free from water, the liquid medium comprises a ketone, for example methyl ethyl ketone or an alcohol, for example a $C_{1-4}$-alkanol, or ethanol or propanol.

In one embodiment, the organic solvent free from water may be a single organic solvent or a mixture of two or more organic solvents.

In one embodiment, the medium is an organic solvent free from water it is a mixture of 2 to 5 different organic solvents. This allows a medium to be selected which gives good control over the drying characteristics and storage stability of the composition.

Media comprising an organic solvent free from water are particularly useful where fast drying times are required and particularly when printing onto hydrophobic and non-absorbent substrates, for example plastics, metal and glass.

In one embodiment, low melting solid media have a melting point in the range from 60° C. to 125° C. Suitable low melting point solids include long chain fatty acids or alcohols, in particular those with $C_{1-24}$ chains, and sulfonamides. The compound of formula (I) may be dissolved in the low melting point solid or may be finely dispersed in it.

The compound of formula (I) according to the invention exhibits a high solubility in aqueous media. Accordingly, in one embodiment, the liquid medium is water or a mixture of water and at least one water miscible organic solvent.

In one embodiment, the composition may also contain additional components conventionally used in inkjet printing inks, for example viscosity and surface tension modifiers, corrosion inhibitors, biocides, kogation reducing additives and surfactants which may be ionic or non-ionic.

The composition according to the invention is useful as inks, or printing inks, or inkjet printing inks, printing pastes, or in a dyeing bath for dyeing a substrate.

In one embodiment, when a composition according to the third aspect of the present invention is used as an inkjet printing ink, the ink has a concentration of less than 100 parts per million, or less than 50 parts per million, in total of halide ions and divalent and trivalent metals. This reduces nozzle blockage in inkjet printing heads, particularly in thermal inkjet printers.

In a fourth aspect, the invention relates to a process for dyeing or printing a substrate with a compound of formula (I) according to the first aspect of the invention and a composition according to the third aspect of the invention.

The compound of formula (I) according to the first aspect of the invention and the composition according to the second aspect of the invention are useful as dyestuffs, especially for the coloration of inks for inkjet printing. The dyes are also suitable for dyeing and printing in a conventional manner. The compound exhibits a high solubility in aqueous media and provides dyeings which exhibit improved high light fastness and wet/washing fastness when applied on a substrate or incorporated into inks for inkjet printing.

In one embodiment, the invention relates to a process for dyeing or printing a substrate comprising contacting of at least one compound of formula (I) according to the first aspect of the invention or a composition according to the third aspect of the invention with said substrate.

The compound of formula (I) according to the first aspect of the invention and the composition according to the third aspect of the invention, depending upon the substitution of the aryl groups denoted as $K^1$ and $K^2$, may be useful as dyestuffs, in particular fiber-reactive dyestuffs, for dyeing and/or printing hydroxy-group containing or nitrogen-containing organic substrates.

The term "dyeing" as used herein encompasses all processes of adding color to a substrate, in particular to a textile. Dyeing is normally carried out in a dyebath containing at least one dye, or a dyeing composition.

In one embodiment, the dyeing process is an exhaust-dyeing process, in which temperatures within the range of from 40 to 100° C., or 50 to 80° C. are used.

The term "exhaust dyeing process" as used herein is to be understood as a process in which the dye is gradually transferred from a relatively large volume dyebath to the organic substrate being dyed over a relatively long period of time (see A Review of Textile Dyeing Processes, Perkins W. S, 1991. Textile Chemist & Colorist vol. 23(8) 23-27).

In one embodiment, the dyeing process is a continuous dyeing process.

The term "continuous dyeing process" as used herein is to be understood as a process in which the substrate to be dyed is fed continuously into a dye range. Examples of a continuous dyeing process are pad-steam process or pad-dry process.

The compound of formula (I) according to the invention exhibits good exhaust and fixation yields. Moreover, any unfixed dyestuff is easily washed from the substrate.

The term "printing" as used herein is to be understood as a process to reproduce text or images on a substrate. The printing process may be an inkjet printing process, which is a non-impact printing technique in which droplets of ink are ejected through a fine nozzle onto a substrate without bringing the nozzle into contact with the substrate.

The term "substrate" as used herein encompasses all substrates of natural or synthetic origin. The substrate may be present in the form of a textile, (i.e. material consisting or comprising of natural or synthetic polyamides such as wool, silk and all nylon types, or cotton). The term "substrate" also encompasses hydroxy- or nitrogen-containing materials.

Further examples for the form/appearance of the substrate are yarn, woven fabric, loop-formingly knitted fabric carpet comprising or consisting of an organic substrate, e.g. natural or synthetic polyamides (for example wool, silk and all nylon types), polyurethanes, cellulose as well as hydrophobic and non-absorbent substrates, for example plastics, metal and glass.

In one embodiment, substrates for dyeing are leather and fibrous materials, which comprise natural or synthetic polyamides and, particularly, natural or regenerated cellulose such as cotton, viscose and spun rayon.

In one embodiment, the substrates for dyeing are textiles comprising cotton.

In one embodiment, substrates for printing are paper, plastic, textiles, metal, glass, or an overhead projector slide.

Dyeing or printing may be carried out in accordance with known methods conventional in the dyestuff field.

In one embodiment, the inkjet printer applies the ink to the substrate in the form of droplets which are ejected through a small orifice onto the substrate. In one embodiment, inkjet printers are piezoelectric inkjet printers and thermal inkjet printers. In thermal inkjet printers, programmed pulses of heat are applied to the ink in a reservoir by means of a resistor adjacent to the orifice, thereby causing the ink to be ejected in the form of small droplets directed towards the substrate during relative movement between the substrate and the orifice. In piezoelectric inkjet printers the oscillation of a small crystal causes ejection of the ink from the orifice.

The dyeings and prints derived from the new dyestuffs, in particular the new fiber-reactive dyestuffs exhibit good wet/washing fastness properties such as wash, water, sea water and sweat fastness and in particular excellent light fastness. They also exhibit good resistance to oxidation agents such as chlorinated water, hypochlorite bleach, peroxide bleach and perborate-containing washing detergents.

The compound of formula (I) according to the invention displays good compatibility with other known dyestuffs. Accordingly, it may be mixed with other dyestuffs to form a composition, which can be used to dye or print suitable substrates. Said other dyestuffs must be compatible with a compound of formula (I), i.e. they must have similar dyeing or printing properties, for example fastness properties.

The compound of formula (I) according to the invention can also be used as yellow component in trichromatic dyeing or printing. Trichromatic dyeing or printing can utilize all customary and known dyeing and printing processes, such as for example the continuous process, exhaustion process, foam dyeing process and inkjet process.

The composition of the individual dye components in the trichromatic dye mixture used in the process of the invention depends on the desired hue. A black hue for example utilizes 30 to 95% by weight or 50 to 90% by weight of navy component, at least one dye according to the invention of the yellow component in an amount of 70 to 5% by weight, or 50 to 10% by weight, and a red component in an amount of 0 to 65% by weight, or 0 to 40% by weight.

The yellow component, as described above, can consist of a single component or of a mixture of different yellow individual components conforming to the formula (I).

Particularly preferred blue and/or red components are described in WO2007/039573 (compounds I (blue), III and IV (red)).

The dyes can also be used in the production of pulp dyeing of bleached and unbleached paper. They can furthermore be used in dyeing paper according to the dip dyeing process (i.e. the process of submerging selected portions of materials into a dye bath to create a design).

In one embodiment a process for printing an image on a substrate comprising applying thereto an ink containing a compound of formula (I) by means of an inkjet printer.

In one embodiment, the invention relates to an inkjet printer cartridge containing an ink, characterized in that the ink contains at least one compound of formula (I) according to the first aspect of the invention, or a salt thereof.

In one embodiment the ink contained in the inkjet printer cartridge is a composition according to the third aspect of the present invention.

The dyes according to the invention provide sharp, non-feathered images when applied by printing techniques (classical and non-impact printing techniques) having good water-fastness, light-fastness and optical density. Details of this technology are described for example in the inkjet printing section of R. W. Kenyon in "Chemistry and Technology of Printing and Imaging Systems", Peter Gregory (editor), Blackie Academic & Professional, Chapmann & Hall 1996, pages 113 to 138, and references cited therein.

In one embodiment, the ink used in this process comprises a composition as defined in the third aspect of the present invention.

In one embodiment, when the substrate is a textile the ink according to the invention is applied thereto by:
i) applying the composition to the textile using an inkjet printer, and
ii) heating the printed textile at a temperature of from 50° C. to 250° C.

In one embodiment, the textiles are natural, synthetic and semi-synthetic materials. Examples of natural textiles include wool, silk, hair and cellulosic materials, particularly cotton, jute, hemp, flax and linen. Examples of synthetic and semi-synthetic textiles include polyamides, polyesters, polyacrylonitriles and polyurethanes.

In one embodiment, the textile has been treated with an aqueous pre-treatment composition comprising a thickening agent and optionally a water-soluble base and a hydrotropic agent and dried prior to step i) above.

In one embodiment, the pre-treatment composition comprises a solution of the base and the hydrotropic agent in water containing the thickening agent. Particularly preferred pre-treatment compositions are described more fully in EP534660A1.

In a fifth aspect, the invention relates to a substrate, comprising at least one compound of formula (I) according to the first aspect of the invention.

In one embodiment, the invention relates to a substrate obtainable by a process for dyeing and/or printing said substrate, comprising contacting of at least one compound of formula (I) according to the first aspect of the invention or a composition according to the second aspect of the invention with said substrate.

In a sixth aspect, the invention relates to the use of a compound according to the first aspect of the invention or as prepared according to the second aspect of the invention or a composition according to the third aspect of the invention for the preparation of an ink, a printing ink, an inkjet printing ink, a printing paste or a dyeing bath for printing or dyeing a substrate.

According to this aspect, the invention also relates to an ink or printing ink or inkjet printing ink or printing paste or dyeing bath for printing or dyeing a substrate, comprising

23 the compound of formula (I) as defined in the first aspect of the invention or the composition according to the third aspect of the invention.

EXAMPLES

The invention is further illustrated by the following examples in which all parts and percentages are by weight unless otherwise stated and all temperatures are given in degrees Centigrade.

Example 1

285.0 parts of 4-(®-sulfatoethylsulfonyl)anilin are suspended in 700 parts of ice water and 185.0 parts of 30% hydrochloric acid and diazotized at 0 to 5° C. by dropwise addition of 179.0 parts of 40% sodium nitrite solution. After removal of excess of nitrite with amidosulfonic acid the diazonium salt suspension is added to a suspension of 151.2 parts 3-aminophenylurea in 500 parts of ice water. Using sodium bicarbonate the pH is set to 4.5 to 5 and kept constant during coupling reaction by further addition of sodium carbonate until end of coupling. The resulting suspension contains a mixture of monoazo dyes having the formulas

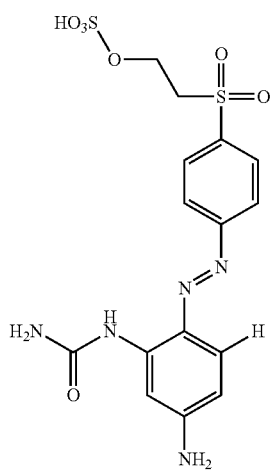

(i)

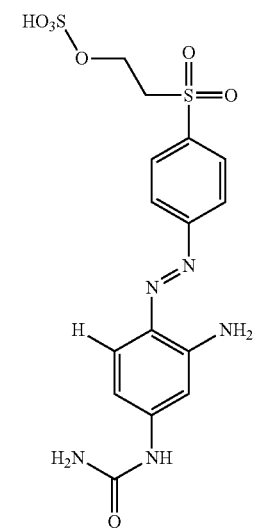

(ii)

24

-continued

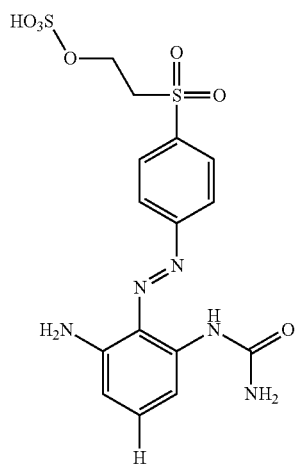

(iii)

In a separate reactor 372.2 parts of 2-amino-5-(®-sulfatoethylsulfonyl)benzenesulfonic acid are suspended in 1000 parts of ice water and 279 parts of 30% hydrochloric acid and diazotized by dropwise addition of 252.6 parts of 40% sodium nitrite solution. After removal of the excess of nitrite with amidosulfonic acid, the resulting diazo solution is added dropwise at 5 to 10° C. to the first coupling stage (i to iii). Using sodium bicarbonate the pH is adjusted maintained at 4.5 to 5 during addition. After addition pH is adjusted slowly to 6 to 6.5 and is held constant using sodium carbonate until the end of the second coupling. Temperature was allowed to increase up to 20° C. during that time. After reaction is completed a mixture of the following dyestuffs having a maximum absorbance ($\lambda_{max}$) of 478 nm is obtained:

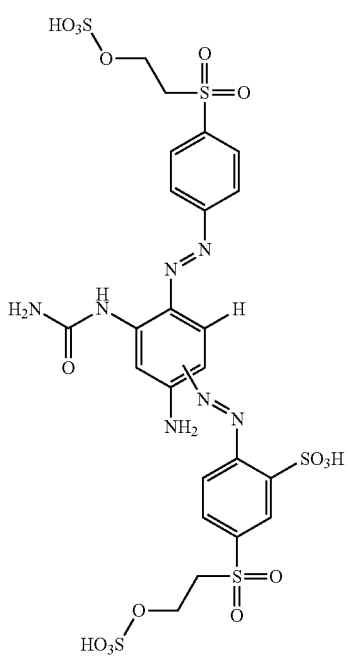

(1a)

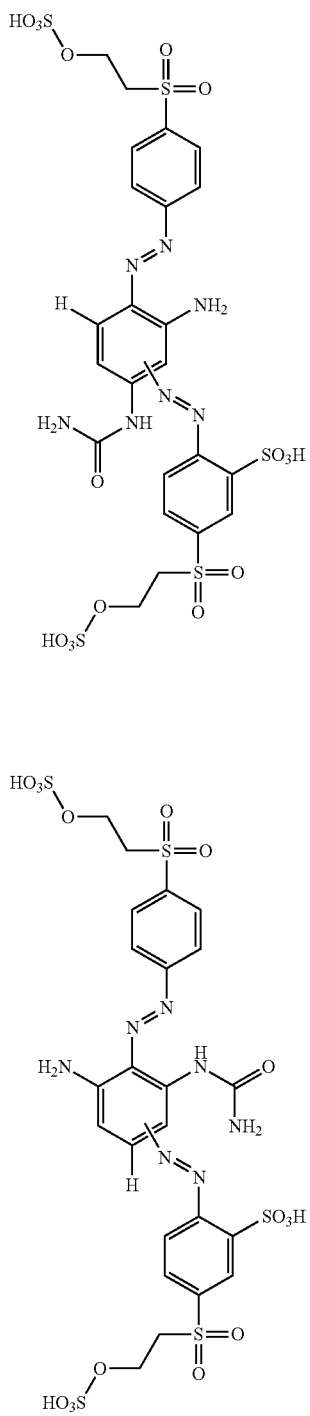

After isolation by salting out with sodium chloride, evaporation in vacuum or spray drying a brownish powder is obtained, which leaves yellow dyeings on cellulosic material, especially on cotton. The dyeings exhibit high fastness properties. In combination with navy or black and reddish components this resulting dyestuff works also very well as yellow shading component for black mixtures, which show excellent fastness behaviour on the same substrates.

Examples 2-15

Table 1 shows dyestuffs which were obtained in a similar manner as described in Example 1. The starting material was chosen accordingly. The dyes leave yellow to yellowish-brown dyeings or prints on cotton revealing good fastness properties. In combination with C.I. Reactive Black 5 and reddish components these yellowish-brown dyestuffs work also very well as yellow shading component for black mixtures with excellent fastness behaviour.

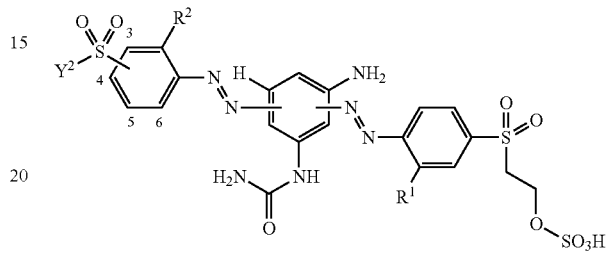

TABLE 1

| Example | $R^1$ | $R^2$ | $Y^2$ | Position of $SO_2Y^2$ | $\lambda_{max}$ [nm] |
|---|---|---|---|---|---|
| 2 | —SO₃H | H | —CH₂CH₂OSO₃H | 5 | 480 |
| 3 | —SO₃H | —SO₃H | —CH₂CH₂OSO₃H | 4 | 470 |
| 4 | —SO₃H | —OCH₃ | —CH₂CH₂OSO₃H | 4 | 485 |
| 5 | —SO₃H | —OCH₃ | —CH₂CH₂OSO₃H | 5 | 487 |
| 6 | H | H | —OH | 4 | 482 |
| 7 | H | H | —OH | 3 | 479 |
| 8 | H | —SO₃H | —OH | 5 | 477 |
| 9 | —SO₃H | H | —OH | 4 | 467 |
| 10 | —SO₃H | H | —OH | 3 | 478 |
| 11 | H | H | —OH | 6 | 481 |
| 12 | —SO₃H | H | —OH | 6 | 479 |
| 13 | —OCH₃ | H | —OH | 4 | 483 |
| 14 | —OCH₃ | H | —OH | 3 | 486 |
| 15 | —OCH₃ | H | —OH | 6 | 485 |

Example 16

411.4 parts of 2-Amino-6-(2-(sulfooxy)ethylsulfonyl)naphthalene-1-sulfonic acid are suspended in 700 parts of ice water and 185.0 parts of 30% hydrochloric acid and diazotized at 0 to 5° C. by dropwise addition of 179.0 parts of 40% strength sodium nitrite solution. After removal of excess of nitrite with amidosulfonic acid this diazonium salt suspension is added to a suspension of 151.2 parts 3-aminophenylurea in 500 parts of ice water. Using sodium bicarbonate pH is set to 4.5 to 5 and kept constant during coupling reaction by further addition of sodium carbonate until end of coupling. The resulting suspension contains a mixture of monoazo dyes having the formulas

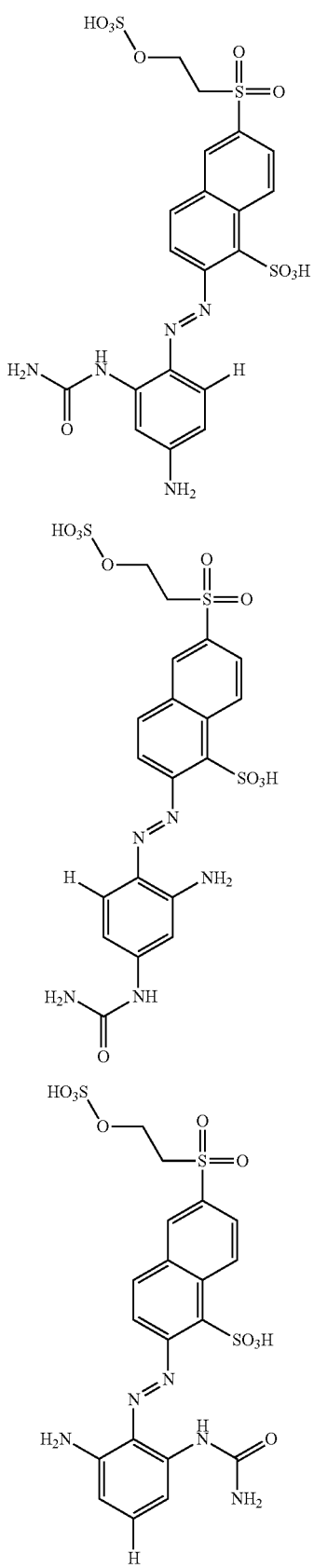

(iv)

(v)

(vi)

In a separate reactor 372.2 parts of 2-amino-5-(®-sulfa-toethylsulfonyl)benzenesulfonic acid are suspended in 1000 parts of ice-water and 279 parts of 30% hydrochloric acid and diazotized by dropwise addition of 252.6 parts of 40% sodium nitrite solution. After removal of the excess of nitrite with amidosulfonic acid, the resulting diazo solution is added dropwise at 5 to 10° C. to the first coupling stage (iv-vi). Using sodium bicarbonate the pH is adjusted maintained at 4.5 to 5 during addition. After addition pH is adjusted slowly to 6 to 6.5 and is held constant using sodium carbonate until the end of the second coupling. Temperature was allowed to increase up to 20° C. during that time.

After reaction is completed a mixture of the following dyestuffs having a maximum absorbance ($\lambda_{max}$) of 486 nm is obtained:

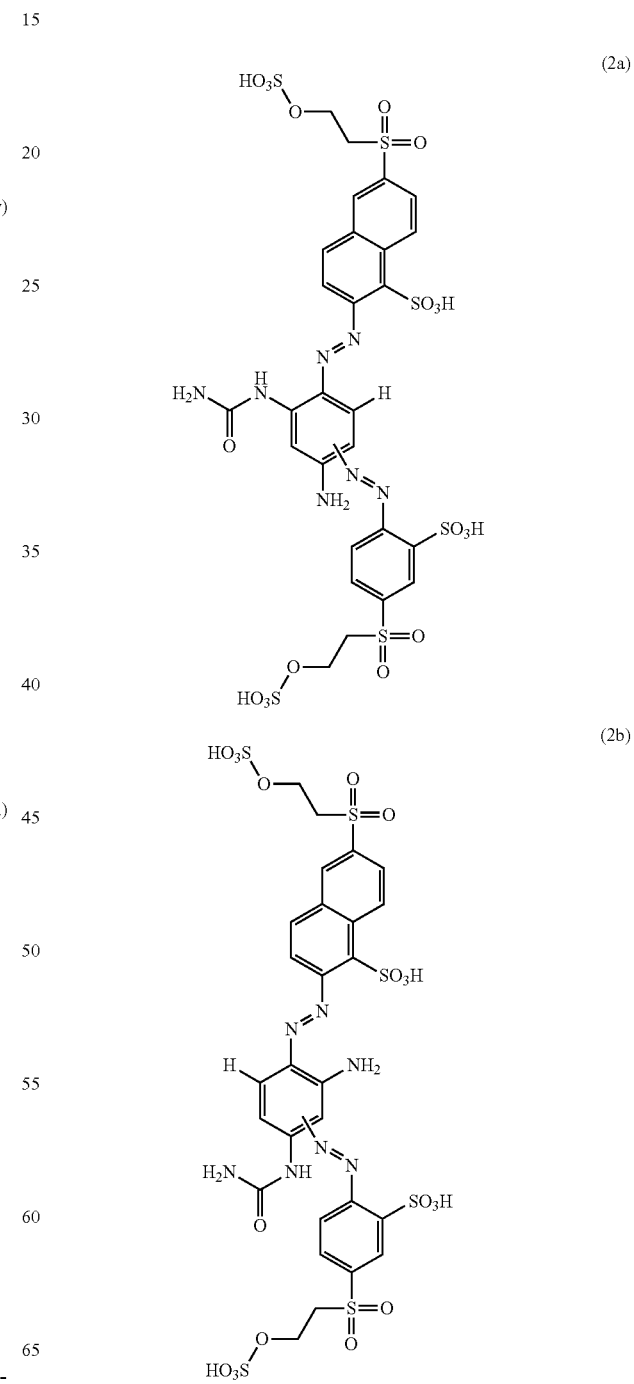

(2a)

(2b)

-continued (2c)

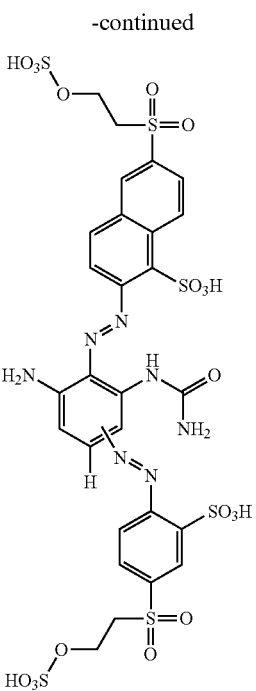

After isolation by salting out with sodium chloride, evaporation in vacuum or spray drying a brownish powder is obtained, which leaves orange dyeings on cellulosic material, especially on cotton, of high fastness properties. In combination with navy or black and reddish components this resulting dyestuff works also very well as shading component for black mixtures, which show excellent fastness behaviour on the same substrates.

Examples 17-40

Table 2 shows dyestuffs which were obtained in a similar manner as described in Example 16. The starting material was chosen accordingly. The dyes leave orange dyeings or prints on cotton revealing good fastness properties. In combination with C.I. Reactive Black 5 and reddish components these dyestuffs work also very well as shading component for black mixtures with excellent fastness behaviour.

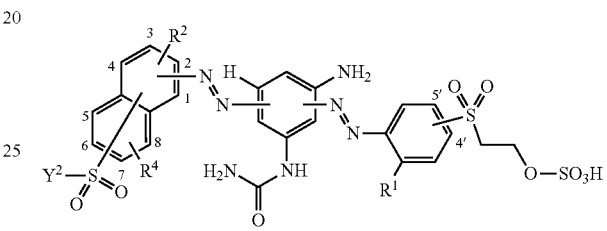

TABLE 2

| Example | $R^1$ | $R^2$ | Position of $R^2$ | $R^4$ | Position of $R^4$ | Position of azo group | $Y^2$ | Position of $SO_2Y^2$ | Position of —SO$_2$CH$_2$CH$_2$OSO$_3$H | $\lambda_{max}$ [nm] |
|---|---|---|---|---|---|---|---|---|---|---|
| 17 | H | —SO$_3$H | 1 | H |  | 2 | —CH$_2$CH$_2$OSO$_3$H | 6 | 4' | 480 |
| 18 | H | —SO$_3$H | 1 | H |  | 2 | —CH$_2$CH$_2$OSO$_3$H | 6 | 5' | 483 |
| 19 | —OCH$_3$ | —SO$_3$H | 1 | H |  | 2 | —CH$_2$CH$_2$OSO$_3$H | 6 | 4' | 491 |
| 20 | —OCH$_3$ | —SO$_3$H | 1 | H |  | 2 | —CH$_2$CH$_2$OSO$_3$H | 6 | 5' | 493 |
| 21 | —SO$_3$H | H |  | H |  | 2 | —CH$_2$CH$_2$OSO$_3$H | 6 | 4' | 482 |
| 22 | —SO$_3$H | —SO$_3$H | 4 | H |  | 1 | —OH | 6 | 4' | 480 |
| 23 | H | —SO$_3$H | 4 | H |  | 1 | —OH | 6 | 4' | 481 |
| 24 | H | —SO$_3$H | 4 | H |  | 1 | —OH | 6 | 5' | 482 |
| 25 | —SO$_3$H | —SO$_3$H | 3 | —SO$_3$H | 8 | 2 | —OH | 6 | 4' | 480 |
| 26 | H | —SO$_3$H | 3 | —SO$_3$H | 8 | 2 | —OH | 6 | 4' | 483 |
| 27 | —SO$_3$H | —SO$_3$H | 3 | —SO$_3$H | 8 | 2 | —OH | 6 | 4' | 489 |
| 28 | H | —SO$_3$H | 3 | —SO$_3$H | 8 | 2 | —OH | 6 | 4' | 488 |
| 29 | H | —SO$_3$H | 3 | —SO$_3$H | 8 | 2 | —OH | 6 | 5' | 487 |
| 30 | —SO$_3$H | —SO$_3$H | 4 | H |  | 2 | —OH | 8 | 4' | 486 |
| 31 | —SO$_3$H | —SO$_3$H | 4 | —SO$_3$H | 6 | 2 | —OH | 8 | 4' | 488 |
| 32 | —SO$_3$H | H |  | —SO$_3$H | 6 | 2 | —OH | 8 | 4' | 486 |
| 33 | H | H |  | —SO$_3$H | 6 | 2 | —OH | 8 | 4' | 489 |
| 34 | —SO$_3$H | —SO$_3$H | 1 | H |  | 2 | —OH | 5 | 4' | 486 |
| 35 | H | —SO$_3$H | 1 | H |  | 2 | —OH | 5 | 4' | 487 |
| 36 | H | —SO$_3$H | 1 | H |  | 2 | —OH | 5 | 5' | 489 |
| 37 | —OCH$_3$ | —SO$_3$H | 1 | H |  | 2 | —OH | 5 | 4' | 491 |
| 38 | —OCH$_3$ | —SO$_3$H | 1 | H |  | 2 | —OH | 5 | 5' | 489 |
| 39 | H | H |  | H |  | 2 | —OH | 1 | 4' | 487 |
| 40 | —SO$_3$H | H |  | H |  | 2 | —OH | 1 | 4' | 485 |

Application Example A 0.3 parts of the dyestuff of Example 1 is dissolved in 100 parts of demineralised water and 8 parts of Glauber's salt (calcined) are added. The dyebath is heated to 50° C., then 10 parts of cotton fabric (bleached) are added. During the addition of sodium carbonate the temperature is kept at 50° C. Subsequently, the dyebath is heated to 60° C., and dyeing is effected for a further one hour at 60° C.

The dyed fabric is then rinsed with running cold water for 3 minutes and afterwards with running hot water for a further 3 minutes. The dyeing is washed at boiling temperature for 15 minutes in 500 parts of demineralised water in the presence of 0.25 parts of Marseille soaps. After being rinsed with running hot water for 3 minutes and centrifuged, the dyeing is dried in a cabinet dryer at about 70° C. A yellowish brown cotton dyeing is obtained showing good fastness properties, in particularly good light and wet/washing fastness properties, which is stable towards oxidative influences.

Application Example B

To the dyebath containing in 100 parts of demineralised water 5 parts of Glauber's salt (calcined), 10 parts of cotton fabric (bleached) are added. The bath is heated to 50° C. within 10 minutes, and 0.2 parts of the dyestuff of Example 1, 0.7 parts of a commercially available preparation of C.I. Reactive Black 5 and 0.1 part of the scarlet dye (111-2) of Preparation Example 124 of patent application WO 2007/039573:

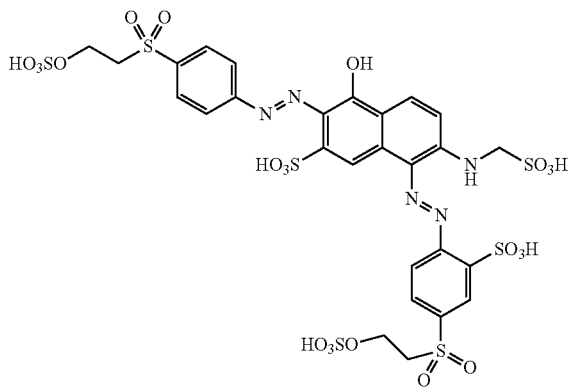

After a further 30 minutes at 50° C., 1 part of sodium carbonate (calcined) is added. The dyebath is then heated to 60° C. and dyeing is continued at 60° C. for a further 45 minutes.

The dyed fabric is rinsed with running cold and then hot water and washed at the boil according to the method given in Application Example A. After rinsing and drying a black cotton dyeing is obtained which has the same good fastness properties as indicated in Application Example A.

Similarly, the dyestuff of Examples 2 to 40 or mixtures of the exemplified dyestuffs may be employed to dye cotton in accordance with the method described in Application Example A or B. The cotton dyeings thus obtained are yellow to brown and show good fastness properties, in particular light-fastness.

Application Example C

A printing paste consisting of

| | |
|---|---|
| 40 | parts of the dyestuff of Example 1 |
| 100 | parts of urea |
| 350 | parts of water |
| 500 | parts of a 4% sodium alginate thickener and |
| 10 | parts of sodium bicarbonate |
| 1000 | parts in all | is applied to cotton fabric in accordance with conventional printing methods.

The printed fabric is dried and fixed in steam at 102° C. to 104° C. for 4 to 8 minutes. It is rinsed in cold and then hot water, washed at the boil (according to the method described in Application Example A) and dried. A yellowish brown print is obtained which has good general fastness properties.

Similarly, the dyestuffs of Examples 2 to 40 or mixtures of the exemplified dyestuffs may be employed to print cotton in accordance with the method given in Application Example C. All prints obtained are yellowish brown and show good fastness properties, in particular good light fastness properties.

Application Example D 70 parts of chemically bleached sulfite cellulose of pinewood and 30 parts of chemically bleached sulfite cellulose of birchwood are grounded in a Hollander in 2000 parts of water. 0.2 Parts of the dyestuff of Example 1 are sprinkled into this pulp. After mixing for 20 minutes, paper is produced therefrom. The absorbent paper obtained in this way is dyed yellow. The waste water is practically colourless.

Application Example E 0.5 parts of the dyestuff powder of Example 1 are dissolved in 100 parts of hot water and cooled to room temperature. The solution is added to 100 parts of chemically bleached sulfite cellulose, which have been grounded in a Hollander with 2000 parts of water. After thorough mixing for 15 minutes, sizing takes place in the usual way with rosin size and aluminium sulfate. Paper which is produced from this material has a yellow shade, and has good waste-water and wet/washing fastness, as well as good light fastness.

Application Example F

An absorbent length of unsized paper is drawn through a dyestuff solution of the following composition at 40-50° C.:

| | |
|---|---|
| 0.5 | parts of the dyestuff of Example 1 |
| 0.5 | parts of starch and |
| 99.0 | parts of water. |

The excess dyestuff solution is squeezed out through two rollers. The dried length of paper is dyed yellowish brown.

Dyeing may also take place in a similar manner to that of Examples D to F using the dyestuffs of Examples 2 to 40, or a dye preparation thereof. The paper dyeings obtained are yellow or yellowish brown and have a high level of fastness.

Application Example G 50 parts of bleached pinewood sulfite cellulose and 50 parts of bleached beech cellulose (degree of beating 30° SR (Schopper Riegler degree)) are mixed with 0.5 parts of the dyestuff of Example 1 in water (pH 4, water hardness 10° dH). After 16 minutes, sheet formation takes place. The paper is dyed in an intense yellow shade. In contrast, a dyeing made at pH 7 shows no variation in depth or shade.

Application Example H 1.1 parts of the dyestuff of Example 1 are dissolved at 60° C. in 100 parts of demineralized water and subsequently diluted with 900 parts of cold, demineralized water. Then, 100 parts of cotton tricot (bleached) are added to the dye bath. After 5 minutes, 10 parts of calcinated sodium sulfate and 2 parts of ammonium sulfate are added. During 70 minutes, the temperature of the dye bath is continuously raised to 98° C. This temperature is maintained for 20 minutes and the dye bath is then cooled to 70° C. over the course of 30 minutes. The dyed material is rinsed for 2 minutes firstly with cold demineralized water and subsequently for 2 minutes with cold tap water, then centrifuged and dried. The cotton dyeing obtained has a yellowish brown shade.

Application Example I 100 parts of cotton tricot, which have been dyed with the dyestuff of Example 1 analogously to the method of Example H in ca. 1/1 standard depth, are mixed without intermediate drying in 1000 parts of tap water at 25° C. with 5 parts of sodium chloride and 4 parts of an after-treatment agent obtained from the reaction of diethylenetriamine with dicyandiamide. The pH value of the dye bath is set at 6.5 to 7. The bath is heated to 60° C. over the course of 20 minutes, and this temperature is maintained for a further 20 minutes. Afterwards, the material is rinsed with cold tap water. The yellow cotton dyeing which has been after-treated in this way has perfect washing fastness and very good light fastness.

Application Example J

A cotton dying produced with the dyestuff of Example 1 analogously to the method of Example H in 1/1 standard depth, is impregnated on a padder with a solution, which contains 100 g/l of an after-treatment agent obtained by reacting the after-treatment agent of Example I with dimethyloldihydroxyethyleneurea and a hardening catalyst, and it is squeezed out to a pick-up of ca. 80%. It is subsequently shock-dried for 45 seconds on a stenter at a temperature of 175 to 180° C. The yellow cotton dyeing thus obtained is notable for its perfect washing fastness. At the same time, there is a considerable improvement in the creasing fastness, and reduced swelling value of the cellulosic fibers.

Application Example K 2.5 parts of the dyestuff obtained in Example 1 are dissolved with stirring at 25° C. in a mixture of 20 parts diethyleneglycol and 77.5 parts water to obtain a printing ink suitable for inkjet printing.

The invention claimed is:
1. A compound of formula (I)

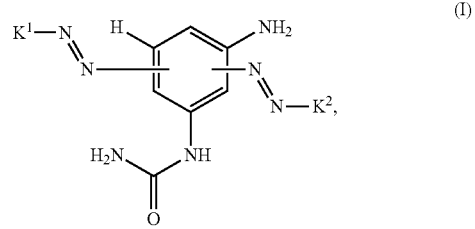

wherein $K^1$ and $K^2$ are independently unsubstituted or substituted aryl, and
wherein substituents of the substituted aryl are selected from the group consisting of H, —$SO_3H$, unsubstituted or substituted, linear or branched $C_{1-6}$ alkyl, unsubstituted or substituted, linear or branched $C_{1-6}$ alkoxy or $SO_2Y$, wherein Y is —OH, —CH=$CH_2$ or —$CH_2CH_2$—Z, wherein Z is a leaving group which can be eliminated by $OH^-$ ions.

2. The compound according to claim 1, wherein the substituents of the substituted alkyl and alkoxy groups are selected from the group consisting of halogen, —CN, —$NH_2$ or —COOH.

3. The compound according to claim 1, wherein $K^1$ is

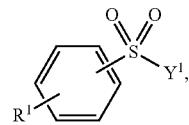

$K^2$ is

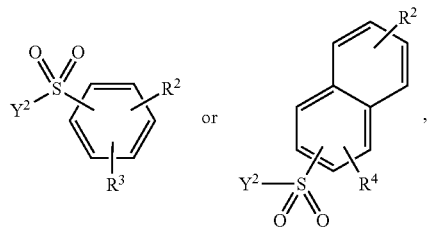

$R^1$ and $R^2$ are independently H, —$SO_3H$, unsubstituted or substituted, linear or branched $C_{1-6}$ alkyl or unsubstituted or substituted, linear or branched $C_{1-6}$ alkoxy,
$R^3$ is H, unsubstituted or substituted, linear or branched $C_{1-6}$ alkyl or unsubstituted or substituted, linear or branched $C_{1-6}$ alkoxy,
$R^4$ is H or —$SO_3H$,
$Y^1$ and $Y^2$ are independently —OH, —CH=$CH_2$ or —$CH_2CH_2$—Z, wherein Z is a leaving group which can be eliminated by $OH^-$ ions.

4. The compound according to claim 1, wherein $K^1$ is

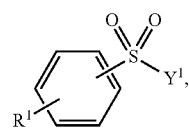

$K^2$ is

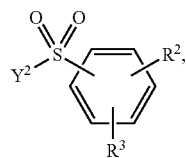

$R^1$ and $R^2$ are independently H, —SO$_3$H, unsubstituted or substituted $C_{1-2}$ alkyl or unsubstituted or substituted $C_{1-2}$ alkoxy, $R^3$ is H, methyl or methoxy, $Y^1$ and $Y^2$ are independently —OH, —CH=CH$_2$ or —CH$_2$CH$_2$—Z, wherein Z is —Cl or —OSO$_3$H.

5. The compound according to claim 1, wherein
$K^1$ is

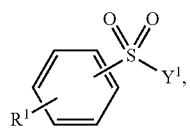

$K^2$ is

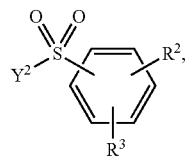

$R^1$ and $R^2$ are independently H, —SO$_3$H, unsubstituted or substituted $C_{1-2}$ alkyl or unsubstituted or substituted $C_{1-2}$ alkoxy, $R^3$ is H, $Y^1$ and $Y^2$ are independently —OH, —CH=CH$_2$ or —CH$_2$CH$_2$—Z, wherein Z is —Cl or —OSO$_3$H.

6. The compound according to claim 1, wherein
$K^1$ is

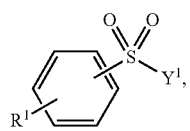

$K^2$ is

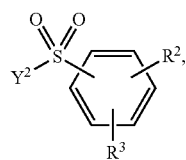

$R^1$ and $R^2$ are independently H, —SO$_3$H, unsubstituted or substituted $C_{1-2}$ alkyl or unsubstituted or substituted $C_{1-2}$ alkoxy, $R^3$ is H, $Y^1$ and $Y^2$ are independently —OH, —CH=CH$_2$ or —CH$_2$CH$_2$—Z, wherein Z is —Cl or —OSO$_3$H, wherein the SO$_2$Y$^1$ group is in para-position or in meta-position to the azo group.

7. The compound according to claim 1, wherein
$K^1$ is

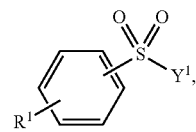

$K^2$ is

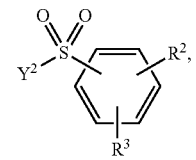

$R^1$ is —SO$_3$H, $R^2$ and $R^3$ are H, $Y^1$ and $Y^2$ are —CH$_2$CH$_2$—Z, wherein Z is —OSO$_3$H, wherein the SO$_2$Y$^1$ group and the SO$_2$Y$^2$ group are in para-position to the azo groups and wherein $R^1$ is in ortho-position to the azo group.

8. The compound according to claim 1, wherein
$K^1$ is

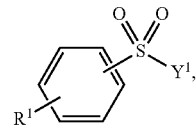

$K^2$ is

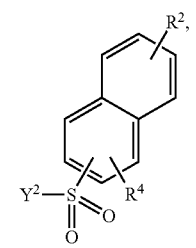

$R^1$ and $R^2$ are independently H, —SO$_3$H, unsubstituted or substituted, linear or branched $C_{1-6}$ alkyl or unsubstituted or substituted, linear or branched $C_{1-6}$ alkoxy, $R^4$ is H or —SO$_3$H, $Y^1$ and $Y^2$ are independently —OH, —CH=CH$_2$ or —CH$_2$CH$_2$—Z, wherein Z is a leaving group which can be eliminated by OH$^-$ ions.

9. The compound according to claim 1, wherein
K¹ is

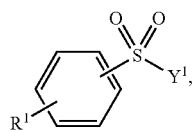

K² is

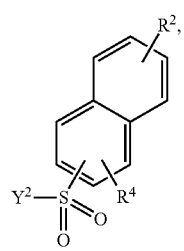

R¹ and R² are independently H, —SO₃H, unsubstituted or substituted $C_{1-2}$ alkyl or unsubstituted or substituted $C_{1-2}$ alkoxy,
R⁴ is H or —SO₃H,
Y¹ and Y² are independently —OH, —CH=CH₂ or —CH₂CH₂—Z, wherein Z is —Cl or —OSO₃H.

10. The compound according to claim 1, wherein
K¹ is

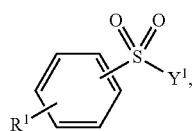

K² is

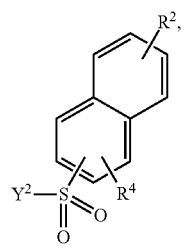

R¹ and R² are independently H, —SO₃H, unsubstituted or substituted $C_{1-2}$ alkyl or unsubstituted or substituted $C_{1-2}$ alkoxy,
R⁴ is H,
Y¹ is —CH=CH₂ or —CH₂CH₂—Z, wherein Z is —Cl or —OSO₃H,
Y² is —OH, —CH=CH₂ or —CH₂CH₂—Z, wherein Z is —Cl or —OSO₃H.

11. The compound according to claim 1, wherein
K¹ is

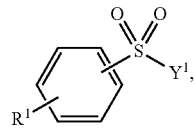

K² is

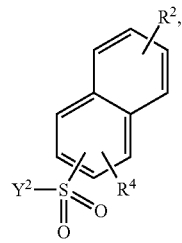

R¹ and R² are independently H, —SO₃H, unsubstituted or substituted $C_{1-2}$ alkyl or unsubstituted or substituted $C_{1-2}$ alkoxy,
R⁴ is H,
Y¹ is —CH=CH₂ or —CH₂CH₂—Z, wherein Z is —Cl or —OSO₃H,
Y² is —OH, —CH=CH₂ or —CH₂CH₂—Z, wherein Z is —Cl or —OSO₃H,
wherein the SO₂Y¹ group is in para-position or in meta-position to the azo group.

12. The compound according to claim 7, wherein N=N—K¹ is at position 4 of the 3-aminophenylurea component and N=N—K² is at position 6 thereof.

13. The compound according to claim 1, wherein
K¹ is

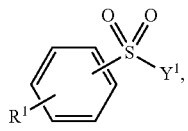

K² is

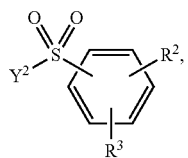

R¹ is —SO₃H,
R² and R³ are H,
Y¹ is —OH, and
Y² is —CH₂CH₂—Z, wherein Z is —OSO₃H,
wherein the SO₂Y¹ group is in meta-position to the azo group to which 10 is attached,
wherein the SO₂Y² group is in para-position to the azo group to which K² is attached, and
wherein R¹ is in ortho-position to the azo group to which 10 is attached.

14. The compound according to claim 13, wherein N=N—K$^1$ is at position 6 of the 3-aminophenylurea component and N=N—K$^2$ is at position 4 thereof.

15. A compound of formula (I) according to claim 1,
wherein N=N—K$^1$ is at position 2 of the 3-aminophenylurea component and N=N—K$^2$ is at position 6 thereof or N=N—K$^1$ is at position 4 of the 3-aminophenylurea component and N=N—K$^2$ is at position 6 thereof or N=N—K$^1$ is at position 6 of the 3-aminophenylurea component and N=N—K$^2$ is at position 2 thereof or N=N—K$^1$ is at position 6 of the 3-aminophenylurea component and N=N—K$^2$ is at position 4 thereof.

16. A composition comprising at least one compound of formula (I) according to claim 1
and a medium, wherein the composition comprises
(a) from 0.01 to 30 parts, or from 0.1 to 20 parts, or from 0.5 to 15 parts, or from 1 to 5 parts of at least one compound of formula (I) or a salt thereof; and
(b) from 70 to 99.99 parts, or from 80 to 99.9 parts, or from 85 to 99.5 parts, or from 95 to 99 parts of a medium comprising a mixture of water and an organic solvent, an organic solvent free from water, or a solid having a melting point in a range from 60° C. to 125° C.,
wherein all parts are by weight and the number of parts of (a)+(b) amounts to 100.

17. A process for manufacture of the compound of formula (I) according to claim 1, comprising at least:
(i) reacting 3-aminophenylurea (V)

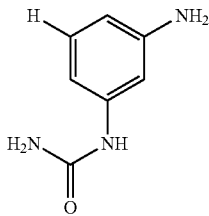

with either a compound of formula (II) in diazotized form

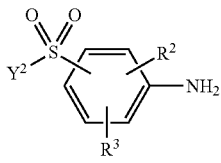

or a compound of formula (III) in diazotized form

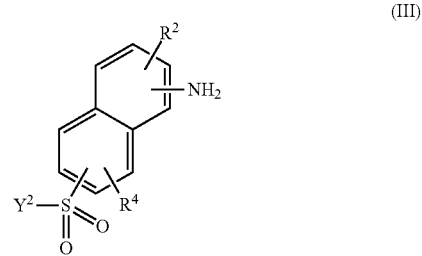

(ii) reacting the product obtained in step (i) with a compound of formula (IV) in diazotized form

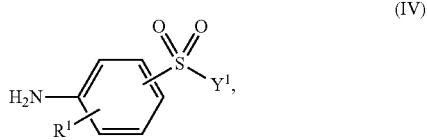

or at least comprising:
(i) reacting a 3-aminophenylurea (V) with a compound of formula (IV) in diazotized form
(ii) reacting the product obtained in step (i) with either a compound of formula (II) in diazotized form or a compound of formula (III) in diazotized form.

18. The composition according to claim 16, wherein the composition comprises:
(a) from 1 to 5 parts of at least one compound of formula (I) or a salt thereof; and
(b) from 95 to 99 parts of a medium comprising a mixture of water and an organic solvent, an organic solvent free from water, or a solid having a melting point in a range from 60° C. to 125° C.,
wherein all parts are by weight and the number of parts of (a)+(b) amounts to 100.

19. Ink or printing ink or inkjet printing ink or printing paste or dyeing bath for printing or dyeing a substrate, comprising the compound according to claim 1.

* * * * *